US009288205B2

(12) United States Patent
Nishi

(10) Patent No.: US 9,288,205 B2
(45) Date of Patent: Mar. 15, 2016

(54) IMAGE PROCESSING APPARATUS, AND AUTHENTICATION PROCESSING METHOD IN THE SAME

(71) Applicants: Kabushiki Kaisha Toshiba, Tokyo (JP); Toshiba Tec Kabushiki Kaisha, Tokyo (JP)

(72) Inventor: Kouichirou Nishi, Shizuoka-ken (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/181,494

(22) Filed: Feb. 14, 2014

(65) Prior Publication Data

US 2015/0237043 A1    Aug. 20, 2015

(51) Int. Cl.
*G06F 21/30*   (2013.01)
*H04L 29/06*   (2006.01)
*G06F 17/30*   (2006.01)

(52) U.S. Cl.
CPC ...... *H04L 63/0853* (2013.01); *G06F 17/30893* (2013.01)

(58) Field of Classification Search
CPC ....... G06F 21/00; G06F 21/41; G06F 21/608; G06F 3/01; G06F 3/04845; G06F 21/629; H04L 63/0815; H04L 9/3226; H04N 1/4413; H04N 1/4433; H04N 1/00413; H04N 1/00411; H04N 1/00416; H04N 1/00427; H04N 1/00482; H04N 1/00503; H04N 1/00474; H04N 1/00344; H04N 1/00424; H04N 1/0048; H04N 1/4406; H04N 1/4426; G03G 15/502; G06K 15/00
USPC ............ 726/9, 19; 358/1.14, 1.15, 1.16, 1.18, 358/3.28; 715/762
See application file for complete search history.

(56) References Cited

U.S. PATENT DOCUMENTS

| 8,797,564 B2 * | 8/2014 | Suwabe | 358/1.14 |
| 2009/0251724 A1 | 10/2009 | Nakajima | |
| 2011/0102853 A1 * | 5/2011 | Makishima et al. | 358/3.28 |
| 2012/0311469 A1 * | 12/2012 | Kunori et al. | 715/762 |
| 2013/0061319 A1 * | 3/2013 | Yasuhara | 726/19 |

FOREIGN PATENT DOCUMENTS

| JP | 2009-232113 | 10/2009 |
| JP | 2012-084081 | 4/2012 |

* cited by examiner

*Primary Examiner* — Thanhnga B Truong
(74) *Attorney, Agent, or Firm* — Patterson & Sheridan, LLP

(57) ABSTRACT

An image processing apparatus includes a function executing unit that executes a plurality of functions including image processing and browsing, a panel that displays a screen associated with the functions of the function executing unit, an authentication unit that authenticates a user based on an input to the panel, a storing unit that associates an authentication token indicating success of authentication by the authentication unit with user privilege level of the authenticated user, and a browser that sends the authentication token stored in the storing unit to a Web server to access content managed by the Web server.

14 Claims, 4 Drawing Sheets

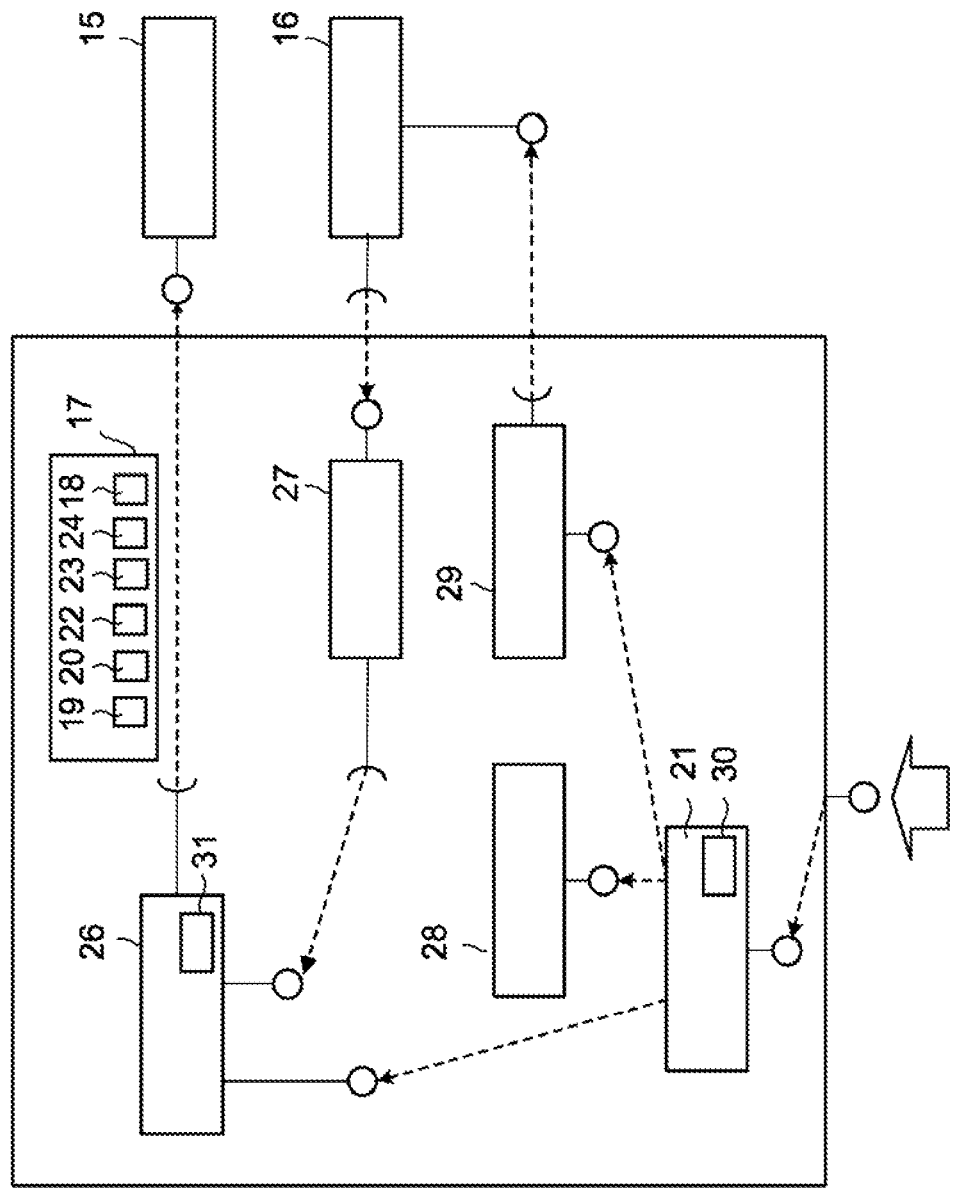

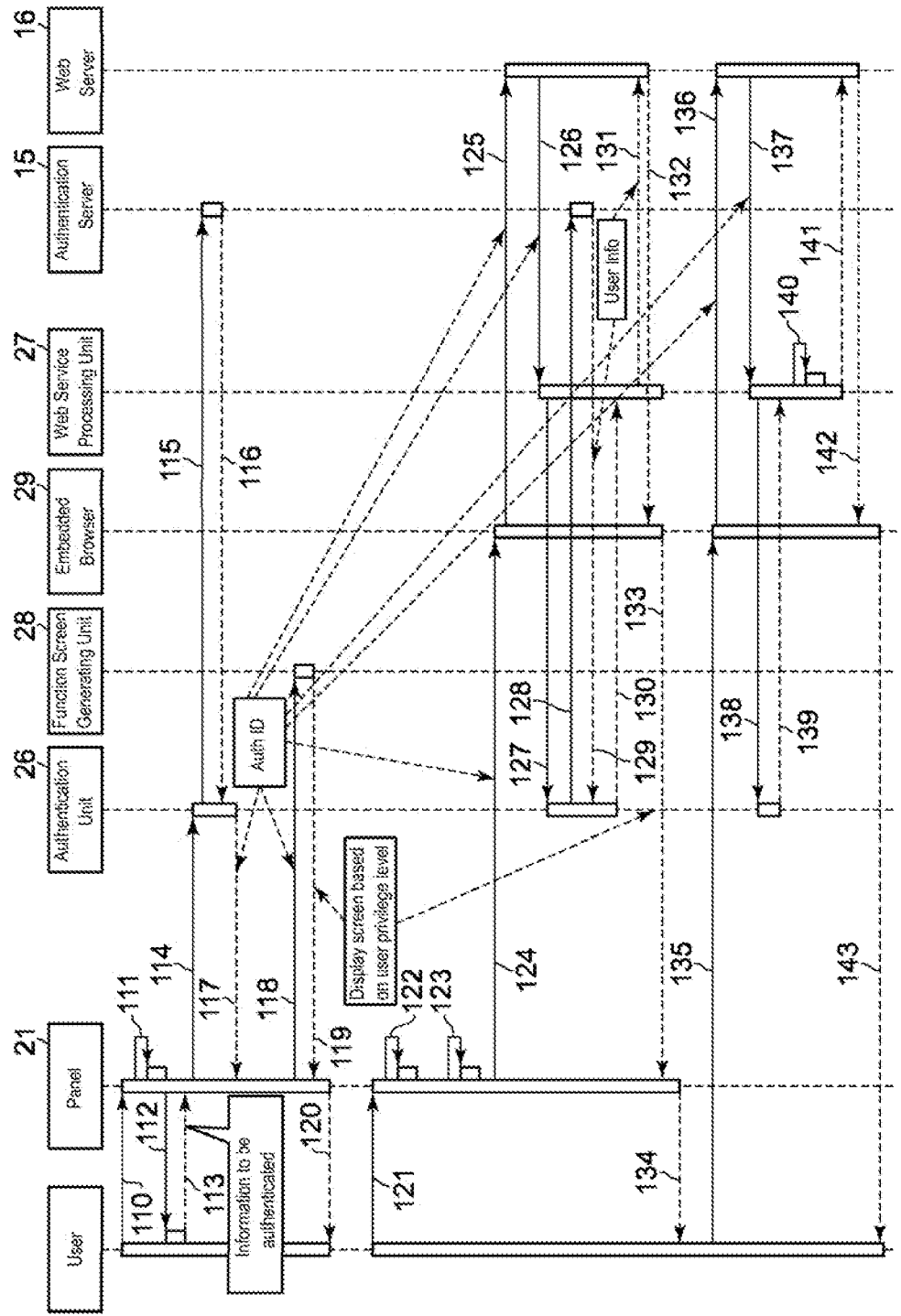

IMAGE PROCESSING APPARATUS, AND AUTHENTICATION PROCESSING METHOD IN THE SAME

FIELD

Embodiments described herein relate generally to an image processing apparatus, and an authentication processing method in the same.

BACKGROUND

An image forming apparatus that is responsive to a panel operation to display Web content and execute a function such as printing of the Web content is known. The image forming apparatus has a Web service processing unit (Web Service) that processes a Web service request. After a browser (a browser application) displays a page image on a screen, when a printing request is sent to a Web server, the server returns a Web service request corresponding to this request to the Web service processing unit. An image forming unit then prints the page image displayed on the screen. The Web service is a mechanism by which the function and services of the image forming apparatus are used via a network, by passing messages to and from the browser, and, when the Web service is used, the image forming apparatus requests authentication by log-in on the panel.

When a Web site that requires user authentication is used from the panel of the image forming apparatus, it is burdensome for the user to perform authentication for each access to the Web server. Thus, a single sign-on that requires the user to perform authentication only once is known.

However, even when the same user operates an image processing apparatus, authentication of the user has to be performed for each Web service. It is troublesome for the user to perform authentication again after moving to another page of the Web site on the panel.

DESCRIPTION OF THE DRAWINGS

FIG. 3 is a functional block diagram of the image processing apparatus according to the embodiment; and FIG. 4 is a sequence diagram showing an example of a scenario of authentication processing performed by the image processing apparatus according to the embodiment.

DETAILED DESCRIPTION

Figure 1:
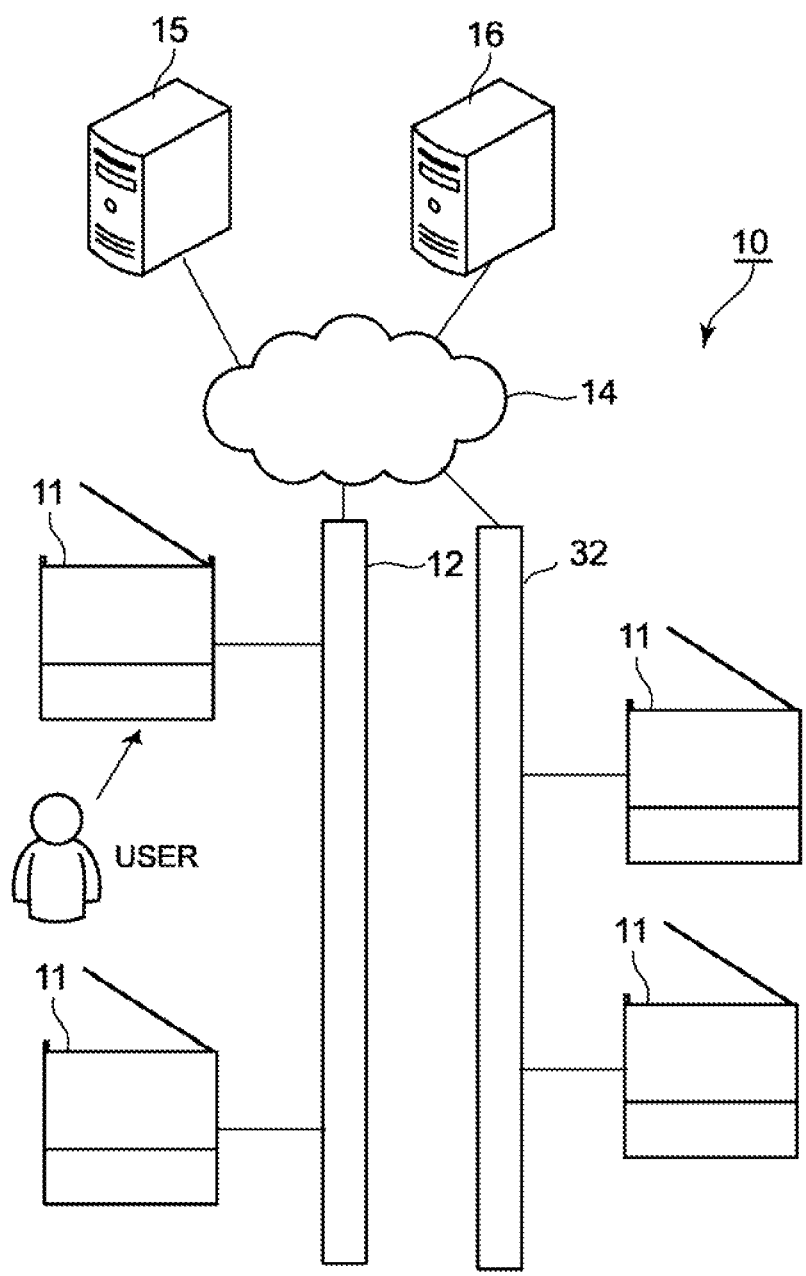
FIG. 1 illustrates a system including an image processing apparatus according to an embodiment.

In general, according to one embodiment, there is provided an image processing apparatus including: a function executing unit that executes a plurality of functions including image processing and browsing; a panel that displays a screen associated with the functions of the function executing unit; an authentication unit that authenticates a user based on an input to the panel; a storing unit that associates an authentication token indicating success of authentication by the authentication unit with user privilege level of the authenticated user; and a browser that sends the authentication token stored in the storing unit to a Web server to access content managed by the Web server.

Moreover, according to another embodiment, there is provided an authentication processing method in an image processing apparatus, the method including: authenticating a user based on the input performed via a screen associated with a plurality of functions including image processing and browsing; storing an authentication token indicating success of authentication with user privilege level of the authenticated user; and sending the authentication token to a Web server to access content managed by the Web server.

Hereinafter, an image processing apparatus according to an embodiment and an authentication processing method executed in the same will be described with reference to FIGS. 1 to 4. It is to be noted that the same portions in the drawings are identified with common reference numerals and overlapping explanations will be omitted.

FIG. 1 illustrates a system including the image processing apparatus according to the embodiment. A system 10 includes a plurality of multi-function peripherals (MFPs) 11. LANs 12 and 32 are provided on a business place-by-business place basis, for example. An authentication server 15 performs authentication processing in response to requests for authentication from the respective MFPs 11 via the LANs 12 and 32 and the Internet 14, and a Web server 16 provides Web content.

Figure 2:
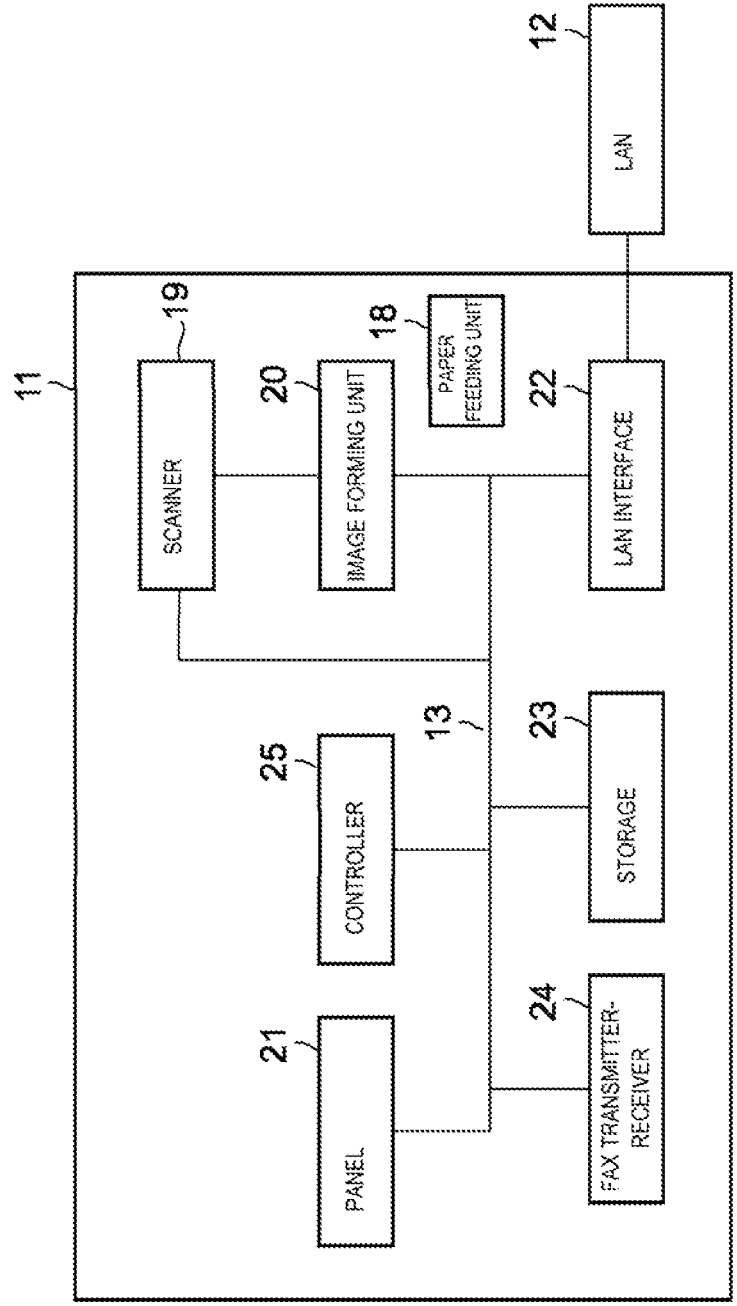
FIG. 2 is a diagram schematically showing the hardware configuration of the image processing apparatus according to the embodiment.

FIG. 2 is a diagram schematically showing the hardware configuration of the MFP 11. The already-described reference numerals represent the same elements as those identified with these reference numerals. The MFP 11 includes a panel 21 on an MFP main body installed in any of the business places. A scanner 19 is connected to the panel 21 by a bus. A storage 23 such as a hard disk drive stores image data from the scanner 19, and a bus 13 connects these elements. The MFP 11 also includes an image forming unit 20 that forms an image based on the image data from the storage 23. A paper feeding unit 18 feeds paper to the image forming unit 20. A FAX transmitter receiver 24 transmits and receives the image data. A LAN interface 22 is connected to the LAN 12 and the bus 13. A controller 25 performs overall control by a CPU, ROM, and RAM.

FIG. 3 is a functional block diagram of the MFP 11. The already-described reference numerals represent the same elements as those identified with these reference numerals. The MFP 11 includes a function executing unit 17 that executes a plurality of functions such as scanning, image formation, copying, printing on paper, browsing, FAX transmission reception, and file retention. The panel 21 displays a screen 30 associated with these functions of the function executing unit 17. A function screen generating unit 28 generates a function screen on the panel 21. An authentication unit 26 authenticates the user based on an input to the panel 21. Furthermore, the MFP 11 includes a storage unit 31 that stores an authentication ID or token that indicates success of authentication by the authentication unit 26 and associates the authentication ID to the user privilege level of the authenticated user, an embedded browser 29 (a browser) that sends the authentication ID stored in the holding unit 31 to the Web server 16, and a Web service processing unit 27 that sends, to the Web server 16, the user information stored in the holding unit 31 in response to a request to acquire the user information from the Web server 16 to the embedded browser 29 and provides, to the Web server 16, the service using the functions of the function executing section 17.

The function executing unit 17 includes the scanner 19, the image forming unit 20, the paper feeding unit 18, the LAN interface 22, the storage 23, and the FAX transmitter receiver 24. The function executing unit 17 executes a requested job using these components. The scanner 19 generates image data by scanning a document surface. The image forming unit 20 generates an electrostatic latent image corresponding to the image data on a photoconductor and develops the electrostatic latent image. The scanner 19, image forming unit 20, and paper feeding unit 18 generate images for copying, printing on paper, and FAX. The storage 23 stores an operating system (OS), application software, and a directory structure on the OS, and provides a storage area for file retention. The FAX transmitter receiver 24 converts the scanned image data into FAX data and transmits the FAX data.

The panel 21 displays an authentication screen when the MFP 11 is set for authentication, and has an interactive user interface function that urges input of information to be authenticated. After authentication, the panel 21 displays user selectable functions such as copying, scanning, and FAX, on the screen 30, a Web page, and the like. The panel 21 may be a touch operation panel or an operation panel with buttons, keys, and a display.

The function screen generating section 28 generates a plurality of function screens that are displayed on the panel 21 after being switched from a base screen. The function screen includes a screen for setting "enlargement or reduction", "page aggregation", and the like, the screen that is displayed after being switched from the base screen when an icon indicating "copying" is selected, for example.

The authentication unit 26 sends an inquiry regarding authentication to the authentication server 15. The authentication unit 26 creates an authentication ID when authentication is successful and stores the authentication ID. The authentication unit 26 also determines whether or not the authenticated user has the authority to access each service such as scanning, copying, printing, browsing, and FAX transmission reception, based on the authentication ID, and the privilege level is classified into, for example, an administrator which is given the highest privileged level, a guest which is given the lowest privilege level, and a user which is given an intermediate privilege level. The functions of the authentication unit 26 are executed as a result of reading a program describing the procedure of authentication processing from the ROM and developing a work area on the RAM by the CPU.

The authentication server 15 is a server that stores data used for authentication, such as a user ID and a password, and has the function of determining whether authentication is successful or not.

The authentication ID held by the storage unit 31 is a token formed of a string of numerals and characters, for example. The storage unit 31 stores the authentication ID and the user privilege level which are received from the authentication server 15 relates the authentication ID and the user privilege level to each other. The storage unit 31 may be provided separately from the authentication unit 26. The storage unit 31 is a storage area of the RAM.

The embedded browser (embedded Web browser (EWB)) 29 is a program that displays a browser application on the panel 21. The embedded browser 29 passes the authentication ID to the Web server 16 as part of, for example, a hyper text transfer protocol (HTTP) header or a cookie. The embedded browser 29 transmits and receives a content file between the embedded browser 29 and the Web server 16 by a communication protocol. The communication protocol may be HTTP and the client is the embedded browser 29, for example. The content file refers to a text, an image, or video.

The Web server 16 returns an HTML image, for example, via the communication protocol or the like when the Web server 16 is browsed by the embedded browser 29. The Web server 16 uses the Web service of the MFP 11.

The Web service processing unit 27 provides the service of the MFP 11 via the network such as the Internet 14 or the LAN 12. The Web service processing unit 27 receives an inquiry about user information from the Web server 16 via the Internet 14, acquires the user information related to the authentication ID included in this inquiry from the authentication server 15, stores the user information in the holding section 31, and notifies the Web server 16 of the user information. The Web service processing section 27 sends the user information to the Web server 16 and the embedded browser 29 displays the content returned from the Web server 16 in the screen 30. The Web service processing unit 27 receives a request for use of any of the functions of the function executing unit 17 or a service from the Web server 16 via the Internet 14, and provides the requested Web service such as printing or browsing.

A method by which the Web service processing unit 27 receives an inquiry or a request for use from the Web server 16 is performed as follows: a file having information regarding Web service to be processed is downloaded from the Web server 16 via the Internet 14, and then the file is analyzed. The function of the Web service processing unit 27 is implemented as a result of executing a program from the ROM by the CPU.

The authentication processing method in the MFP 11 authenticates the user based on: receiving user input via the screen 30 associated with the plurality of functions of the function executing unit 17, storing the authentication ID and relating the authentication ID to the user privilege level, sending user information to the Web server 16 in response to a request from the Web server 16 after sending the authentication ID to the Web server 16, and providing a service to the Web server 16. When the authentication ID and the user information are sent to the Web server 16, the authentication ID is sent from the embedded browser 29, and, in response to a request issued to the Web service processing section 27 from the Web server 16, the Web service processing section 27 reads the user information from the holding section 31 and sends the user information to the Web server 16.

FIG. 4 is a sequence diagram showing an example of a scenario of authentication processing performed by the image processing apparatus according to the embodiment. The already-described reference numerals represent the same elements as those identified with these reference numerals.

When an instruction to display a function screen is given by a user operation, the panel 21 detects the input of "display of a function screen" (Act 110). The panel 21 may check whether the MFP 11 is set for authentication (Act 111). In other words, it is possible to set whether or not to execute authentication processing. If the MFP 11 is set for authentication, the panel 21 displays the authentication screen (Act 112). For example, the authentication screen such as a log-in screen is displayed. If the MFP 11 is not set for authentication, the panel 21 displays, on the authentication screen, a message saying that the MFP 11 is not set for authentication.

Next, the panel 21 receives the input of information to be authenticated (e.g., a user name, a password) if authentication is required for the user operation (Act 113). The panel 21 notifies the authentication unit 26 that authentication is to be performed on the information to be authenticated (Act 114). The authentication unit 26 notifies the authentication server 15 located outside the MFP 11 that authentication is to be performed by using the information to be authenticated (Act 115). The authentication server 15 stores user information in advance. As the user information, the authentication server 15 stores, for example, a user name, a password, a division, and user authority as related information.

When the authentication server 15 successfully performs authentication using the user name and the password, the authentication server 15 notifies the authentication unit 26 of success of authentication and user privilege level (Act 116). In response to success of authentication, the authentication unit 26 creates an authentication ID and stores the authentication ID and the user privilege level in the storage unit 31. The authentication unit 26 returns the authentication ID in the form of a token, for example, to the panel 21 (Act 117). The panel 21 makes a request to the function screen generating unit 28 with the authentication ID to display a function screen (Act 118). The function screen generating unit 28 notifies the panel 21 to display a function screen according to the user privilege level of the authorized user (Act 119). The panel 21 then displays the function screen (Act 120).

Then, the user operates the panel 21 (Act 121). The panel checks whether authentication of the user in the currently-used MFP 11 is valid or invalid (Act 122). If authentication is valid, the panel 21 may check whether single sign-on in the current MFP 11 is set (Act 123). If single sign-on is set, the embedded browser 29 is requested using the authentication ID to display a screen (Act 124). Furthermore, the embedded browser 29 adds the authentication ID to a header of an HTTP request that is sent to the Web server 16 (Act 125).

The Web server 16 makes a request to the Web service processing unit 27 using the authentication ID included in the HTTP header to acquire the user information (Act 126). The Web service processing unit 27 makes a request to the authentication unit 26 to acquire the user information related to the authentication ID (Act 127). If the authentication ID is valid, the authentication unit 26 makes a request to the authentication server 15 for the user information related to the authentication ID (Act 128), acquires the user information related to the authentication ID from the authentication server 15 (Act 129), and returns the user information to the Web service processing unit 27 (Act 130).

Then, the Web service processing unit 27 returns the user information to the Web server 16 (Act 131). The Web server 16 returns a screen based on the user information and the user privilege level to the embedded browser 29 (Act 132). The embedded browser 29 displays the screen on the panel 21 (Acts 133 and 134). The screen has restrictions on disclosure based on, for example, a division of the user, an information disclosure period, printing authority, information browsing restrictions, and so forth.

Based on the user operation, the panel 21 accepts a selection of a service whose execution is desired by the user from the screen displayed thereon by the embedded browser 29 and notifies the embedded browser 29 of the selected service (Act 135). The embedded browser 29 makes a request to the Web server 16 for execution of the selected service (Act 136). The Web server 16 makes a request to the Web service processing unit 27 using the authentication ID to execute the service (Act 137). The Web service processing unit 27 makes a request to the authentication unit 26 to determine whether or not the service is executable based on the authentication ID (Act 138). If the determination result indicates that the service is executable, the authentication unit 26 notifies the Web service processing unit 27 of the determination result (Act 139), and the Web service processing unit 27 executes the requested service (Act 140). For example, display of a Web page, printing of a page, or the like may be executed. The Web service processing unit 27 may return the execution results of the service or the like to the Web server 16 (Act 141). The Web server 16 returns a screen according to the execution results to the embedded browser 29 (Act 142). The embedded browser 29 displays the screen on the panel 21 (Act 143).

The above configuration makes it possible to omit authentication processing performed by the user when a plurality of screens are displayed or the Web service processing unit 27 is used in the MFP 11. By performing authentication only once, it becomes possible to share the authentication information among a plurality of services or a plurality of user interfaces and use an authorized function.

The Web server 16 makes an inquiry to the Web service processing unit 27 about the user information by using the authentication ID and acquires the user information, which makes it possible to display a screen for a service which is provided to the user without displaying an authentication screen again on the panel 21. Single sign-on can be implemented in this manner. With the image processing apparatus according to the embodiment and the authentication processing method in the same, since the storage unit 31 that stores the authentication ID is provided in the authentication unit 26 of the image processing apparatus and the authentication ID is passed from the storage unit 31 to the Web server 16 after performing exchange with the Web server 16, it is possible implement single sign-on.

In the embodiment described above, the authentication unit 26 makes the authentication server 15 located outside the apparatus perform user authentication. However, when the number of MFP 11 is one, user authentication may be performed in the MFP 11. It is also possible to perform user authentication by an authentication device such as a card reader that uses a magnetic card or an IC card which is held by the user or a portable terminal with an identification function which is held by the user. The program that executes authentication processing can be installed in a plurality of places such as the Web service processing unit 27, the Web server 16, and the panel 21. When, for example, a request for any type of Web service is sent from the Web server 16 to the Web service processing unit 27, a request for authentication to the Web server 16 is sent from the MFP 11, or operation to perform input to the screen 30 on the panel 21 is performed, the program executes authentication processing. Moreover, when a peripheral device is connected to the MFP 11, the MFP 11 may perform user authentication to use this peripheral device. As the storage unit 31, the storage area of the storage 23 may be used in conjunction with the RAM area. In addition to printing and the like, the Web service may be the use of various types of software such as creation of a report, network mail order, social network service (SNS), and charging for these services. The image processing apparatus according to the embodiment maintains superiority over these examples which are mere implementation of modifications of the embodiment.

While certain embodiments have been described, these embodiments have been presented byway of example only, and are not intended to limit the scope of the inventions. Indeed, the novel embodiments described herein maybe embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An image processing apparatus comprising:
an image processing unit;
a panel configured to receive a first user input of authentication information of a user;
a network interface configured to transmit the authentication information and receive notification of success of user authentication and user privilege level; and
a controller configured to generate an authentication token in association with the authentication information and the user privilege level, when the user is authenticated;

control the panel to display a user interface corresponding to the user privilege level, by which one of functions of the image processing apparatus is selected, control the network interface to transmit the authentication token and the authentication information to a computing device that is connected to the image processing apparatus through a computer network, when a second user input on the user interface designates access to a service managed by the computing device, and control the image processing unit to perform image processing in connection with the service, when the computing device authenticates the user based on the authentication token and the authentication information.

2. The image processing apparatus according to claim 1, wherein the network interface transmits the user authentication information to an authentication server and receives in response thereto the notification of success and the user privilege level.

3. The image processing apparatus according to claim 2, further comprising:

a storage unit, wherein the controller in response to receiving the notification of success and the user privilege level, stores the authentication token and the user privilege level in the storage unit.

4. The image processing apparatus according to claim 1, wherein the controller is further configured to control the panel to display a second user interface based on content returned from the computing device, when the computing device authenticates the user.

5. The image processing apparatus according to claim 4, wherein the computing device returns the content based on the authentication information.

6. The image processing apparatus according to claim 4, wherein when an input of a desired service is made on the second user interface, the controller controls the image processing unit to perform image processing in connection with the desired service.

7. The image processing apparatus according to claim 1, wherein user privilege level is one of an administrator, a user, and a guest.

8. An authentication processing method in an image processing apparatus, the method comprising:

receiving a first user input of authentication information of a user;

transmitting the authentication information, and receiving notification of success of user authentication and user privilege level;

generating an authentication token in association with the authentication information and the user privilege level, when the user is authenticated;

displaying, on a panel, a user interface corresponding to the user privilege level, by which one of functions of the image processing apparatus is selected;

transmitting the authentication token and the authentication information to a computing device that is connected to the image processing apparatus through a computer network, when a second user input on the user interface designates access to a service managed by the computing device; and performing image processing in connection with the service, when the computing device authenticates the user based on the authentication token and the authentication information.

9. The image processing method according to claim 8, wherein the authentication information is transmitted to an authentication server, and the notification of success and the user privilege level is received from the authentication server.

10. The image processing method according to claim 9, further comprising:

in response to receiving the notification of success and the user privilege level, storing the authentication token and the user privilege level in a storage unit.

11. The image processing method according to claim 8, further comprising:

displaying, on the panel, second user interface based on content returned from the computing device, when the computing device authenticates the user.

12. The image processing method according to claim 11, wherein the returned content is based on the authentication information.

13. The image processing method according to claim 12, further comprising:

receiving an input of a desired service on the second user interface, wherein the image processing is performed in connection with the desired service.

14. The image processing method according to claim 8, wherein user privilege level is one of an administrator, a user, and a guest.

* * * * *